2,960,516
Patented Nov. 15, 1960

2,960,516
ORGANO ALUMINUM COMPOUNDS

John F. Nobis, Cincinnati, Ohio, assignor to National Distillers and Chemical Corporation, New York, N.Y., a corporation of Virginia No Drawing. Filed Apr. 17, 1957, Ser. No. 653,268

6 Claims. (Cl. 260—448)

The present invention relates to a method for preparation of compounds of aluminum by reaction of an organo alkali metal compound and an aluminum trihalide and, more particularly, to preparation of compounds of aluminum by reaction of aluminum trichloride with an alkali metal alkyl compound.

The process embodied herein comprises subjecting an organo alkali metal compound to reaction with an aluminum trihalide in the presence of an inert organic polar solvent for the aluminum trihalide. Depending particularly on the relative amounts of reactants employed, the process can be carried out to form directly a tri-substitutedhydrocarbonaluminum compound or an intermediate convertible thereto, such as an organo aluminum dihalide or a diorganoaluminum halide. Thus, and illustrated by use of aluminum trichloride and an alkylsodium as the reactants, the process can be carried out to produce directly either trialkylaluminum, monoalkylaluminum dichloride or dialkylaluminum chloride. More specifically, and in a preferred embodiment, the process embodied herein relates to reaction of aluminum trichloride with alkylsodium in which the alkyl group contains from one to sixteen carbon atoms.

For use as the aluminum-containing reactant, aluminum trichloride is preferred although other aluminum halides such as aluminum tribromide and aluminum triiodide may be employed. As to the organoalkali metal reactant, alkyl alkali metal compounds such as methylsodium, ethylsodium, butylsodium, amylsodium, decylsodium, etc., and the corresponding alkyl lithium compounds, and the like, are preferred. However, other hydrocarbon alkali metal compounds may also be employed and, for example, heterocyclic alkali metal compounds, aromatic alkali metal compounds and the like, such as phenylsodium, benzylsodium, phenylisopropyl potassium and phenyllithium.

As aforesaid, and depending particularly on the relative amount of reactants employed, the process can be utilized to produce a desired organo aluminum-containing compound which may be a trisubstitutedhydrocarbonaluminum or the aforesaid halide-containing products useful as intermediates for conversion to trisubstitutedhydrocarbon aluminum. Generally speaking, the reactants are used in substantially stoichiometric amounts to provide the desired end product in accordance with the following equations wherein R is a hydrocarbon group and a sodium compound is used as illustrative of an alkali metal:

(1) $RNa + AlHal_3 \rightarrow RAlHal_2 + NaHal$
(2) $2RNa + AlHal_3 \rightarrow R_2AlHal + 2NaHal$
(3) $3RNa + AlHal_3 \rightarrow R_3Al + 3NaHal$ However, for Reaction 1, an excess of the aluminum trihalide may be used. In the case of Reactions 1 and 2 resulting in formation of organoaluminum halides, such products can be converted to the corresponding triorgano aluminum by reactions known to those skilled in the art for conversion of organoaluminum halides to triorganoaluminum, an example of such a method being the reaction of the organo aluminum halide with an alkali metal such as sodium.

It has been found that, to form the desired products, the aforedescribed reactions should be carried out in the presence of a polar organic compound that is inert and is a solvent for the aluminum trihalide. For such a purpose, organic ethers are preferred, such for example as diethyl ether, dibutyl ether, diphenyl ether, methyl ether, glycol ethers, such as diethyl ether of ethylene glycol, tetrahydrofuran, and the like. Although aliphatic ethers are preferred, other polar solvents may be employed including tertiary amines such as trimethyl amine, triethylamine, and others. As a result thereof, the end products of the above-described reactions are generally produced in the form of a complex with the polar solvent and, in an illustration using an aliphatic ether, the desired products are obtained as etherates. In carrying out the reactions, the amount of the polar solvent may be varied over a rather wide range, but, preferably, the polar solvent is used in an amount at least substantially equimolar to the aluminum trihalide reactant.

In the use of an organo alkali metal compound reactant, the material can be preformed or prepared in situ for reaction with the aluminum trihalide. For example, an organosodium compound can be prepared by reaction between an organo halide (e.g., alkyl chloride) and sodium to produce the corresponding alkyl sodium. Such a reaction can be carried out in the presence of an inert liquid hydrocarbon (usually used as a dispersant for the sodium reactant) whereby the organo sodium is produced in such a medium. For such a purpose, inert liquid hydrocarbons include heptane, isooctane, mineral spirits, butylether, liquid saturated aliphatic hydrocarbons, toluene, etc.

The organo sodium compound in such a medium can be utilized for carrying out the reaction embodied herein with the aluminum trihalide in the presence of a polar solvent as aforediscussed.

The process embodied herein is, broadly speaking, carried out at a temperature below that at which the desired product of the reaction decomposes. Usually, and as the described reactions are exothermic, reactions such as (1) and (2) can be started at room temperatures and the reaction allowed to proceed without extraneous heating whereas, in the case of Reaction 3 to directly form the triorgano aluminum, a higher starting temperature, such as about 75° C. or above, is preferred. In all cases, however, the temperature is controlled such that it will not reach the decomposition temperature for the desired end product of the reaction. Thus, for production of a product such as triethylaluminum, the temperature is maintained below about 200° C., and for trimethylaluminum to below about 250° C.

In order to further describe the invention, the following embodiments are set forth for purposes of illustration and not limitation.

Example 1 n-Butylsodium was prepared in a 65% yield in 300 ml. of mineral spirits at −10° C. from 0.8 g. atoms of sodium (fine dispersions of 1–3 micron average particle size in mineral spirits) and 0.4 mole of n-butylchloride. To the resulting suspension of n-butylsodium in mineral spirits, 25 grams (0.17 mole) of aluminum trichloride dissolved in 300 ml. of absolute diethyl ether was added over a 20 minute period. At the end of the addition of the trichloride, the exothermic reaction ceased and the reaction mixture was stirred for an additional hour. Withdrawal of a 15 ml. aliquot and carbonation thereof produced no valeric acid, thus evidencing that the butylsodium was consumed. The remainder of the reaction mixture was fractionated and a spontaneously flammable 14 gram portion boiling at 140–145° C. at 3 mm. was identified as di-n-butylaluminum chloride etherate.

ANALYSIS FOR $(C_4H_9)_2AlCl \cdot (C_2H_5)_2O$ ALUMINUM

| | Percent |
|---|---|
| Calculated | 10.8 |
| Found | 11.4 |

Example 2 n-Butyllithium was prepared from 2.8 grams of lithium metal strips and 27.4 grams of n-butyl bromide at −10° C. in 200 ml. of anhydrous diethyl ether. To the resulting suspension of n-butyllithium, 26 grams of aluminum trichloride in 200 ml. of diethyl ether was added resulting in an exothermic reaction. Distillation of the resulting reaction mixture gave 18 grams of a spontaneously inflammable material boiling at 135–140° C. at 2 mm. which was identified as di-n-butyl-aluminum chloride etherate.

ANALYSIS FOR $(C_4H_9)_2AlCl \cdot (C_2H_5)_2O$ ALUMINUM

| | Percent |
|---|---|
| Calculated | 10.8 |
| Found | 10.5 |

Example 3

To 15 grams of the di-n-butylaluminum chloride etherate prepared in Example 2, 1.2 grams of finely divided sodium in mineral spirits was added and the resulting mixture heated to 150° C. The ether was removed by a nitrogen purge whereby there was isolated 5 grams of tri-n-butylaluminum boiling at 80°–85° C. at 1 mm.

Example 4

This example illustrates that, in the absence of a polar solvent as aforedefined, the desired reaction betweeen the organo sodium compound and aluminum trichloride was not effected.

One-half mole of n-butylsodium was prepared as in Example 1 and to the resulting suspension was added 22 grams of aluminum trichloride powder in mineral spirits. No evidence of reaction was observed even though the mixture was heated at 70–80° C. for two hours. Distillation of the mixture gave only n-octane, due to decomposition of the butylsodium, and no pyrophoric material which would indicate formation of an organoaluminum compound.

The same reaction was repeated with phenylsodium and aluminum trichloride in benzene and no evidence of reaction occurred nor were any organoaluminum compounds formed.

Example 5

A 0.9 molar suspension of phenylsodium in 300 ml. isooctane is prepared at 25–30° C. from 0.9 mole of chlorobenzene and 2 gram atoms of dispersed sodium. To this suspension there is slowly added 44.5 grams (0.3 mole) of aluminum chloride in 300 ml. of anhydrous ethyl ether. After a one hour addition time, the reaction mixture is refluxed for four hours and the solvent removed by distillation to provide 50 grams of triphenylaluminum etherate melting at 112–113° C. Heating of this complex under vacuum at 150–250° C. produces substantially pure triphenylaluminum melting at 198–201° C.

Example 6

To 0.5 mole of ethylsodium in 500 ml. of mineral spirits, prepared from 0.75 mole of ethylchloride and 1.5 g. atoms dispersed sodium there is added 0.5 mole (66.7 grams) of aluminum chloride in 500 mls. of ethyl ether. After removal of the excess ether and mineral spirits, there is obtained by distillation 60 grams of ethylaluminum dichloride etherate boiling at 100–105°/3 mm.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for preparation of aluminum compounds containing a hydrocarbon substituent which comprises reacting an alkali metal hydrocarbon with an aluminum trihalide in the presence of an inert organic ether having a —C—O—C— linkage and which is a solvent for the aluminum trihalide, said reaction being carried out at a temperature below the decomposition temperature of the product aluminum compound containing a hydrocarbon substituent.

2. A process, as defined in claim 1, wherein the solvent is diethyl ether.

3. A process, as defined in claim 1, wherein the alkali metal hydrocarbon is an alkylsodium, the aluminum trihalide is aluminum trichloride and the ether solvent is used in an amount at least substantially equimolar to the aluminum trichloride.

4. A process which comprises reacting an alkylsodium with aluminum trichloride in substantially stoichiometric amounts to produce the corresponding alkyl aluminum dichloride, said reaction being carried out in presence of an inert organic ether having a —C—O—C— linkage and which is a solvent for the aluminum trichloride reactant and at a temperature below the decomposition temperature of the alkyl aluminum dichloride product.

5. A process which comprises reacting an alkylsodium with aluminum trichloride in substantially stoichiometric amounts to produce dialkylaluminumchloride, said reaction being carried out in presence of an inert organic ether having a —C—O—C— linkage and which is a solvent for the aluminum trichloride reactant and at a temperature below the decomposition temperature of the dialkylaluminum chloride product.

6. A process which comprises reacting an alkylsodium with aluminum trichloride in substantially stoichiometric amounts to produce trialkylaluminum, said reaction being carried out in presence of an inert organic ether having a —C—O—C— linkage and which is a solvent for the aluminum trichloride reactant and at a temperature below the decomposition temperature of the trialkylaluminum product.

References Cited in the file of this patent

UNITED STATES PATENTS

| 1,938,180 | Groll | Dec. 5, 1933 |
| 2,691,668 | Ziegler et al. | Oct. 12, 1954 |

OTHER REFERENCES

J. Amer. Chem. Soc., 75 (1953), page 5193.
Chemical Reviews, February 1954, page 108.